United States Patent
Salle et al.

(10) Patent No.: US 8,930,887 B2
(45) Date of Patent: Jan. 6, 2015

(54) LINKING MODEL INSTANCES TO PACKAGES

(75) Inventors: Mathias Salle, San Francisco, CA (US); Ping-Hua Hong, Shanghai (CN); Shi Xin, Shanghai (CN)

(73) Assignee: Hewlett-Packard Development Company, L.P., Houston, TX (US)

( * ) Notice: Subject to any disclaimer, the term of this patent is extended or adjusted under 35 U.S.C. 154(b) by 122 days.

(21) Appl. No.: 13/384,675

(22) PCT Filed: Aug. 3, 2009

(86) PCT No.: PCT/US2009/052576
§ 371 (c)(1),
(2), (4) Date: Jan. 18, 2012

(87) PCT Pub. No.: WO2011/016798
PCT Pub. Date: Feb. 10, 2011

(65) Prior Publication Data
US 2012/0124565 A1      May 17, 2012

(51) Int. Cl.
G06F 9/44       (2006.01)
G06F 9/50       (2006.01)
G06F 9/445      (2006.01)

(52) U.S. Cl.
CPC .............. *G06F 9/5061* (2013.01); *G06F 8/30* (2013.01); *G06F 8/34* (2013.01); *G06F 8/61* (2013.01)
USPC ........... 717/104; 717/105; 717/106; 717/108; 717/109

(58) Field of Classification Search
None
See application file for complete search history.

(56) References Cited

U.S. PATENT DOCUMENTS

| | | | |
|---|---|---|---|
| 8,392,566 B1* | 3/2013 | Salle et al. | 709/226 |
| 2003/0055878 A1* | 3/2003 | Fletcher et al. | 709/203 |
| 2004/0249950 A1* | 12/2004 | Christensen et al. | 709/227 |
| 2007/0101336 A1 | 5/2007 | Moore | |
| 2007/0135936 A1* | 6/2007 | Dumas et al. | 700/29 |
| 2008/0065466 A1* | 3/2008 | Liu et al. | 705/10 |
| 2008/0066189 A1* | 3/2008 | Liu et al. | 726/28 |
| 2008/0082987 A1* | 4/2008 | Mao et al. | 719/313 |
| 2008/0270973 A1* | 10/2008 | Edwards et al. | 717/104 |
| 2009/0112646 A1* | 4/2009 | Bruce et al. | 705/7 |
| 2009/0112668 A1* | 4/2009 | Abu El Ata | 705/7 |
| 2009/0113394 A1* | 4/2009 | Weber et al. | 717/126 |
| 2009/0249288 A1* | 10/2009 | Jin et al. | 717/107 |
| 2010/0036751 A1* | 2/2010 | Eidt et al. | 705/27 |
| 2010/0115490 A1* | 5/2010 | Wilcock et al. | 717/104 |
| 2010/0318958 A1* | 12/2010 | Kuester et al. | 717/104 |
| 2011/0196659 A1* | 8/2011 | Salle et al. | 703/6 |
| 2011/0320540 A1* | 12/2011 | Oostlander et al. | 709/206 |
| 2012/0066687 A1* | 3/2012 | Briscoe et al. | 718/104 |
| 2012/0124565 A1* | 5/2012 | Salle et al. | 717/162 |

OTHER PUBLICATIONS

The Hague, Supplementary European Search Report, Nov. 15, 2012, 6 pages, Rijswijk, Netherlands.

(Continued)

*Primary Examiner* — Isaac T Tecklu
(74) *Attorney, Agent, or Firm* — Hewlett-Packard Patent Department

(57) ABSTRACT

In a method 1100 of linking model instances to packages, a service instantiation request is received 1110. The service instantiation request is associated 1120 with service model instance. Linked instances are generated 1130 between the service model instance and available packages. The linked instances are evaluated 1140. Based on the evaluating, a most efficient linked instance of the linked instances is selected 1150 to include in a bound package model of the service instantiation request.

12 Claims, 15 Drawing Sheets

(56) References Cited

OTHER PUBLICATIONS

Dan, Asit et al; "A Layered Framework for Connecting Client Objectives and Resource Capabilities", Internationall Journal of Cooperative Information Systems vol. 5 No. 3 , Sep. 2006, pp. 391-413.

International Search Report and Written Opinion Received in PCT Application No. PCT/US2009/052578, mailed May 4,2010, pp. 11.

Singhal Sharad et al; "Picasso: A Service Oriented Architecture for Model-Base Automation", HP Labs Technical Report, 2008, http://www.hpl.hp.com/techreports/2007/HPL-2007-50RI.html.

\* cited by examiner

Basic Linking Rule

Containment Linking Rule

Dependancy Linking Rule versus

Efficient Use of n-ary Packages Linking Rule

Transitive Containment for n-ary Packages Linking Rule

Non-Additive Package Linking Rule

US 8,930,887 B2

LINKING MODEL INSTANCES TO PACKAGES

BACKGROUND

Presently, customers for information technology (IT) services are able to order many IT services that are remotely implemented and provided by datacenters. These datacenters may be located far away from the customer. Such remotely provided IT services can be economical and convenient for the IT customer as a wide variety of IT services including services such as databases, web servers, internet protocol trackers, online storage and more are provided remotely in exchange for a fee. This relieves the customer of buying actual equipment and software to assemble such IT services. This also relieves the customer of needing to provide space, electricity, and climate control that are required for locally implemented IT services. This can also reduce the workload on the customer as the most or all software and hardware maintenance for these remotely provided IT services is provided by personnel employed by the datacenter or some other remote entity, and not by a local staff of the customer.

Presently these remotely provided IT services, and similarly operator generated IT services of a datacenter, are created manually in processes that requires human involvement in selection of software components that make up a service.

BRIEF DESCRIPTION OF THE DRAWINGS

The accompanying drawings, which are incorporated in and form a part of this specification, illustrate various embodiments of the present invention and, together with the description of embodiments, serve to explain principles discussed below.

Figure 1:
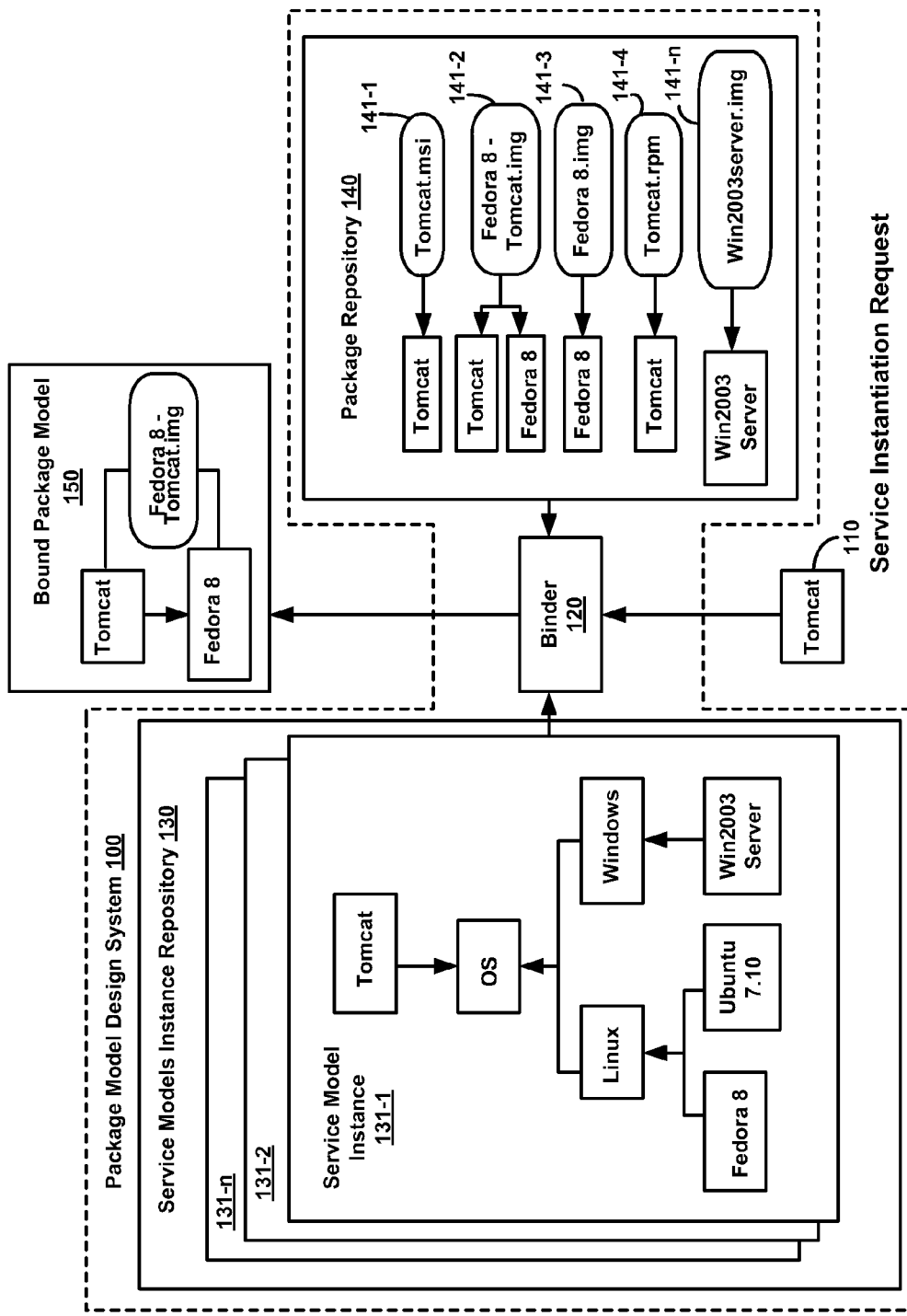
FIG. 1 is an example block diagram showing a package model design system, in accordance with an embodiment.

The drawings referred o in this brief description of the drawings should not be understood as being drawn to scale unless specifically noted.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "receiving," "associating", "generating," "evaluating," "selecting," "outputting," "traversing," "assigning," "creating," "monitoring", "accessing," "providing," "binding," "storing," "including," or the like, often refer to the actions and processes of an electronic computing device or system, such as a datacenter, datacenter management system, package model design system, service instance binder, and/or linked instance generator, among others. The electronic computing device/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Discussion

Presently these remotely information technology (IT) services, and similarly operator generated IT services on a datacenter, are created manually in a "from scratch" process that typically requires human involvement in selection of the software components which make up a service. Automated and repeatable methods and systems for generating IT service instances from models of the service instances are described herein.

There are several ways to associate a service model with its actual physical installation bits. Generally speaking, the cardinality between a service model and installation bits is [n . . . n], which means that a service model can be instantiated through several different installation bits (for example, tomcat server can be instantiated using a *.msi file, a *.exe file, or a *.rpm file) and that the execution of installation bits can result in the creation of several physical artifacts corresponding to different models. For instance, the installation of an image may result in the creation of an OS along with some pre-installed software.

Herein, the model definition of an IT service request is decoupled from the actual physical artifacts (software packages, or "packages") that will be used to bring the model into existence (e.g., instantiated as an IT artifact or service, such as in a datacenter). These models, or "service model instances," serve as a basis for the automation of the lifecycle of IT services. For example, as discussed herein, a service model instance describes the structural, functional, non-functional, and runtime characteristics of an IT service and typically take the form of a tree with a root and nodes. As such, service model instances, as described herein, are defined in a taxonomy through inheritance and can be recursively composed through references to other models.

As described herein, when an IT service request is received it can then be associated with a service model instance that serves as a model for constructing the requested IT service from software packages. As described herein, the components of the service model (i.e. the various nodes) are linked with available packages that can be used to implement the respective types of the components. Often times a plurality of different options are available for such linking. That is, a variety of different combinations of packages can be linked together to form differing linked instances of the service model instance. Such a plurality of linked instances can be evaluated for efficiency of implementation (among other evaluation factors), and a most efficient linked instance (e.g., a most efficient combination of packages) can then be selected and bound together in a package model that satisfies the IT service request and can be implemented as an IT artifact within a datacenter.

Discussion will begin by setting forth a series of definitions. Discussion will then turn to description of a block diagram showing an example package model design system. Aspects and components of the package model design system, including a service instance binder and a linked instance generator, will be described. An example of linking a service model instance to packages will then be discussed, as will a plurality of linking rules. Operation of the package model design system, the service instance binder, and the linked instance generator will be further described in conjunction with discussion of an example method of linking model instances to packages and an example method of generating linked instances between a service model instance and available packages. Finally, discussion will move to description of an example computer system with which or upon which various embodiments of the present invention can be implemented.

Definitions

Service model instance. A service model instance describes the structural, functional, non-functional and runtime characteristics of an IT service. Service model instances are defined in a taxonomy through inheritance and can be recursively composed through references to other models. A service model instance designer is responsible for the creation of a service model instance design. Some examples of service model instances are included herein (see e.g., service model instance 131-1 of FIG. 1 and service model instance 431 of FIG. 4).

Package. A package describes a set or type of capabilities it provides and is associated with a physical software or hardware artifact. A capability represents the physical instantiation of a model. An example of a package might be a "Tomcat.msi" package which provides a Tomcat server when installed in a datacenter. Similarly, a Linux based image with Tomcat installed would be referred to as a "Tomcat.img" package and would provide a Tomcat server and a Linux Operating System (OS) when installed. Packages can be annotated with metadata such as version number, average deployment time, and the like. They also can have dependencies with other packages (requires, conflicts, etc.) The granularity of the package is dependent on the package designer and the design strategy. Packages are not intended to replace existing packaging technologies but rather connect those packages to models (or portions thereof) in a service model instance taxonomy.

Package Characteristics. Packages exhibit a particular characteristic as, in some cases, it is possible to add a package on top of another package whereas in other cases it is not possible. Certain packages are therefore characterized as additive when adding to another package is possible and non-additive when it is not possible. For example, a "Tomcat.msi" package, in one embodiment, is additive because when it is installed, it adds the Tomcat server software to a given OS. Other packages are characterized as non-additive because their installation overwrites or replaces whatever existed before. An image is an example of a non-additive package. The additive or non-additive nature of a package plays a role during the package selection and linking that is described herein. The linking described herein (e.g., in conjunction with link instance generator 230) will automatically follow rules to take care of not selecting a non-additive package to be installed after another package that would be negatively disrupted. It is the responsibility of the package modeler to specify whether a package is or is not additive. It is appreciated that other characteristics such as dependencies, containment, and transitive containment can be associated with packages or rules for the linking of packages to service models.

Unary versus n-ary. It is appreciated that a package can provide either one model (unary) or multiple models (n-ary). It is the responsibility of the package modeler to specify the models provided by a package. This also plays a role during the package selection and linking described herein.

Package constraints. It is possible to express constraints that scope the use of the package. For example, in one embodiment, it is possible to specify that a "Tomcat.msi" package should only be used for a Tomcat model that has a dependency on an OS of type "Windows." Following this example, it is clear that this constrained package should not be selected if the OS is of type "Linux."

Binding. Binding is a process during which reference to other models is resolved either by reusing existing, available and compatible packages or by creating a new one(s) as needed. During binding, linked package instances are committed, or bound together for use in implementing a service model instance to which they have been linked. A bound package model can then be output to a user for review or can be implemented, via grounding, in a datacenter as an IT service (also referred to as an IT artifact). During binding, several processes are performed, including generating of instance candidates (e.g., linked instances of a service model instance); evaluation of the generated instances; and selection of an instance candidate to bind together and output as a bound package model.

Grounding. Grounding is a process of implementing a bound model, such as in a datacenter. During grounding, all the aspects of a bound package model that have not yet been grounded within a datacenter, for example, are installed, activated, configured and monitored.

Example Datacenter Package Model Design System

FIG. 1 is an example block diagram showing package model design system 100, in accordance with an embodiment. It is appreciated that other configurations are possible and that in one embodiment, package model design system 100 may be implemented in a datacenter, a datacenter management system, or a combination of a datacenter management system and a datacenter. It is appreciated the package model design system 100 and/or components thereof can be implemented in hardware, hardware and software, hardware and firmware, or combinations thereof.

With reference to FIG. 1, in one embodiment, package model design system 100 comprises a service instance binder 120, a service model instance repository 130, and a package repository 140. These components are communicatively coupled to one another as required to exchange information in the operation of package model design system 100.

Service instance binder 120 binds a selected linked instance of a service model instance into a bound package model 150. Service instance binder 120 accesses and/or receives information from one or more of service model instance repository 130 and package repository 140. In this manner, service instance binder 120 determines and then binds together a selection of packages, which, in one embodiment comprise service instances available for use or implementation in a datacenter. In one embodiment, the IT service that is represented by the bound package model 150 is an IT service that has been requested, such as by a client (e.g., service instantiation request 110). Numerous components and functions of service instance binder 120 are described in conjunction with description of FIG. 2.

Service model instance repository 130 comprises storage, such as a database or other storage mechanism, which stores a plurality of service model instances. When service instance binder 230 receives a service instantiation request 110, it searches service model instances (131-1 to 131-n) stored in service model instance repository 130 for a service model instance that matches the service instantiation request 110. The matching service model instance 131 is then associated with the service instantiation request 110. The service model instances 131 comprise stored pre-existing templates of IT services instances, represented as model IT service instances and associations with other model IT service instances. These service model instances 131 are typically built in advance of need and can be reused.

Package repository 140 is communicatively coupled with the service instance binder 120 and service model instance repository 130. Package repository 140 comprises storage, such as a database or other storage mechanism, which includes a plurality of stored packages that can be used for linking with nodes of one or more service model instances. As shown in FIG. 1, a plurality of packages 141 (e.g., 141-1 to 141-n) are stored in package repository 140.

Figure 2:
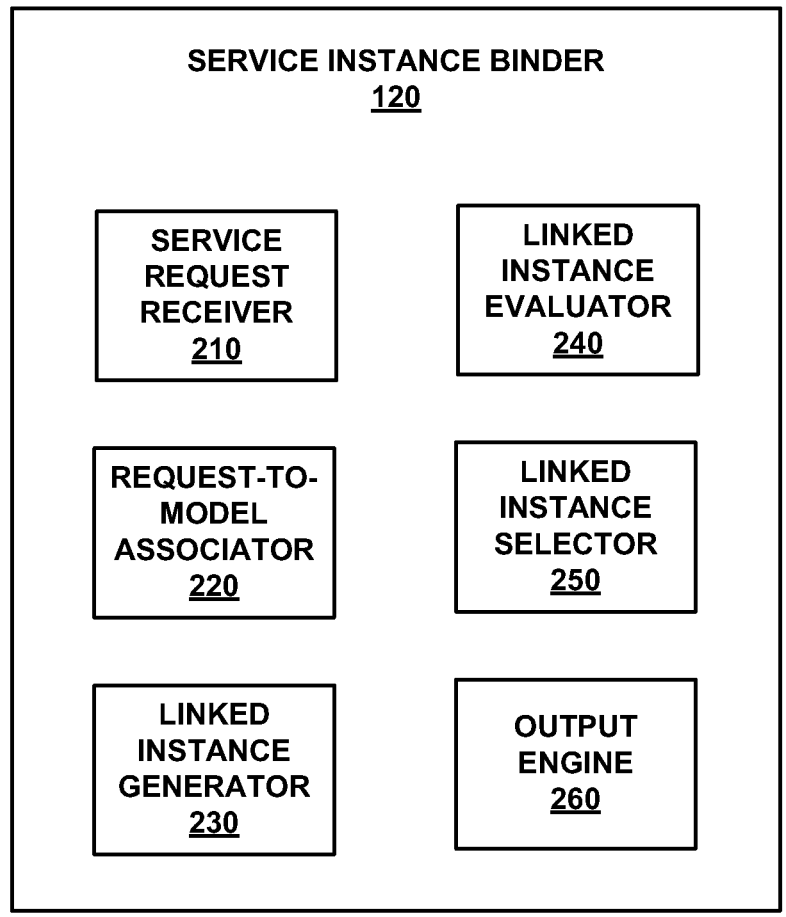
FIG. 2 is an example block diagram of a service instance binder, in accordance with an embodiment.

FIG. 2 is a block diagram of service instance binder 120, in accordance with an embodiment. As depicted in FIG. 2, service instance binder 120 comprises a service request receiver 210, a request-to-model associator 220, a linked instance generator 230, a linked instance evaluator 240, a linked instance selector 250, and an output engine 260. These components are communicatively coupled to one another as required to exchange information in the operation of service instance binder 120. It is appreciated that a greater or lesser number of components are possible in other embodiments, and the components and/or functions may be combined in various ways other than those depicted. It is appreciated that service instance binder 120 and/or components thereof can be implemented in hardware, hardware and software, hardware and firmware, or combinations thereof.

Service request receiver 210, in one embodiment, receives a service instantiation request 110, such as from a user of a datacenter, operator of a datacenter, or the like. In one embodiment, a received service instantiation request 110 is coupled to request-to-model associator 220.

Request-to-model associator 220, in one embodiment, searches out a service model instance 131 that matches with and comprises a model of a service instantiation request 110. Request-to-model associator 220 then associates the matching service model instance (e.g., 131-1) with the received service instantiation request 110. As shown in FIG. 1, a Tomcat service model instance 131-1 is associated with a Tomcat sever service instantiation request 110.

Linked instance generator 230, in one embodiment, generates linked instances between a service model instance 131 and available packages 141 of package repository 140. It is appreciated that the links are generated based on one or more linking rules, examples of which are described herein in conjunction with FIGS. 5-10.

Linked instance evaluator 240, in one embodiment, evaluates efficiency of all or a portion of a linked instance. It is appreciated that the evaluation can be conducted according to one or more rules related to efficiency, such as minimal number of packages needed, minimal number of steps involved in grounding, estimated time to install all required packages during grounding, and the like.

Linked instance selector 250, in one embodiment selects, based on an efficiency evaluation, a selected linked instance from a plurality of linked instances. The selected instance is included in a bound package model 150 that is bound and output from service instance binder 120.

Output engine 260, in one embodiment, outputs a bound package model 150 which can then be grounded or provided back to a requester of service instantiation request 110 for approval, review, inclusion in a catalog of available services, or other use.

Example Linked Instance Generator

Figure 3:
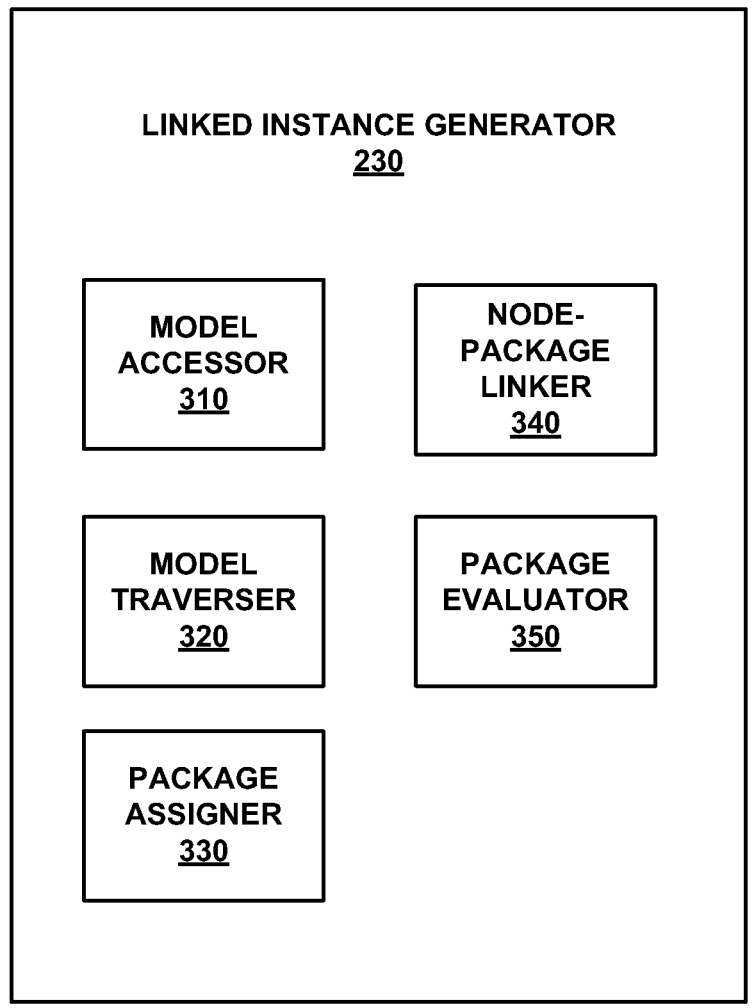
FIG. 3 is an example block diagram of a linked instance generator, in accordance with an embodiment.

FIG. 3 is a block diagram of linked instance generator 230, in accordance with an embodiment. As depicted in FIG. 2, linked instance generator 230 comprises a model accessor 310, a model traverser 320, a package assigner 330, a node-package linker 340, and a package evaluator 350. These components are communicatively coupled to one another as required to exchange information in the operation of linked instance generator 230. It is appreciated that a greater or lesser number of components are possible in other embodiments, and the components and/or functions may be combined in various ways other than those depicted. It is appreciated that linked instance generator 230 and/or components thereof can be implemented in hardware, hardware and software, hardware and firmware, or combinations thereof.

Model accessor 310, in one embodiment accesses a service model instance 131 that has been associated with a service instantiation request 110.

Model traverser 320, in one embodiment, traverses nodes of the accessed service model instance 131-1 to facilitate comparing and linking one or more traversed nodes with a package or packages 141. It is appreciated that, in one embodiment, when possible, model traverser 320 recursively traverses the service model instance 131 until a plurality of linked instances of the service model instance 131 have been generated for evaluation.

Package assigner 330 assigns a matching package to a traversed node.

Node-package linker 340 utilizes linking rules to establish or not establish a link between a node an assigned package.

Package evaluator 350, in one embodiment, evaluates a package assigned to a child node to check for package conflict prior to assigning an available package to a parent node of the child node. For example, this prevents creating a linked instance that uses non-additive packages for parent and child or that includes a parent node that will overwrite information from a child node's linked package during binding.

Description of Example Embodiment Illustrated by FIG. 1

With reference to the example illustrated by FIG. 1. In one embodiment, service request receiver 210 receives a service instance request in the form of service instantiation request 110. It is appreciated that service instantiation request 110 can be received from any of numerous entities, including entities that own or operate system 100 and customers of system 100 or a datacenter and/or datacenter management system upon or with which system 100 operates. In one embodiment, service request receiver 210 receives a service instantiation request 110 from a customer and the received request constitutes a request for a remotely provided IT service, such as an instance of a Tomcat server (as depicted in the example of FIG. 1). In one embodiment, such an IT service request 110 is received as a result of customer interaction with a web interface or other similar online catalog of IT services from which the customer can select and order.

The received request 110 for a Tomcat server is provided to request-to-model associator 220. Request-to-model associator 220 searches model instance repository 130 and associates Tomcat server instantiation request 110 with service model instance 131-1, which is a model of a Tomcat server instance.

Model accessor 310, of linked instance generator 230, accesses service model instance 131-1 and then model traverser 320 traverses the nodes thereof. Package assigner 330, of linked instance generator 230, indentifies that Tomcat-Ubuntu7.10 is invalid since no package 141 satisfies the Ubuntu7.10 requirement. Furthermore, package assigner 330 also identifies that the Tomcat-Fedora8 candidate can be satisfied using a combination of Tomcat.rpm and Fedora8.img or using Fedora8-Tomcat.img. These packages are assigned to the appropriate Tomcat and OS nodes of service model instance 131-1 by package assigner 330, linked to their assigned nodes by node-package linker 340 (in accordance with linking rules), and evaluated for conflicts by package evaluator 350.

In the embodiment illustrated by FIG. 1, the valid candidate set is of linked instances that are generated by linked instance generator 230 is:
1) Tomcat(tomcat.rpm)-Fedora8(fedora8.img), which is generated by linking packages 141-4 to the Tomcat node and package 141-2 to the OS node of service model Instance 131-1;
2) Tomcat(fedora8-tomcat.img)-Fedora8(fedora8-tomcat.img), which is generated by linking package 141-2 to both the Tomcat and OS nodes of service model instance 131-1; and
3) Tomcat(tomcat.msi)-Windows2003 Server (win2003server.img), which is generated by linking package 141-1 to the Tomcat node and package 141-n to the OS node of service model instance 131-1.

Once this valid candidate set of linked instances is established, a score for each of them is computed by linked instance evaluator 240. Linked instance selector 250 then selects the candidate linked instance with the best score to then be bound and output by output engine 260 as bound package model 150. In one embodiment, linked instance selector 250 selects linked instance 2 (Tomcat(fedora8-tomcat.img)-Fedora8(fedora8-tomcat.img)) because it can be implemented with a single package, 141-2, and is therefore judged more efficient than linked instances that require two packages 141. In one embodiment, the grounding of bound package model 150 then takes place as described previously.

Example of Linking a Service Model Instance to Packages

Figure 4:
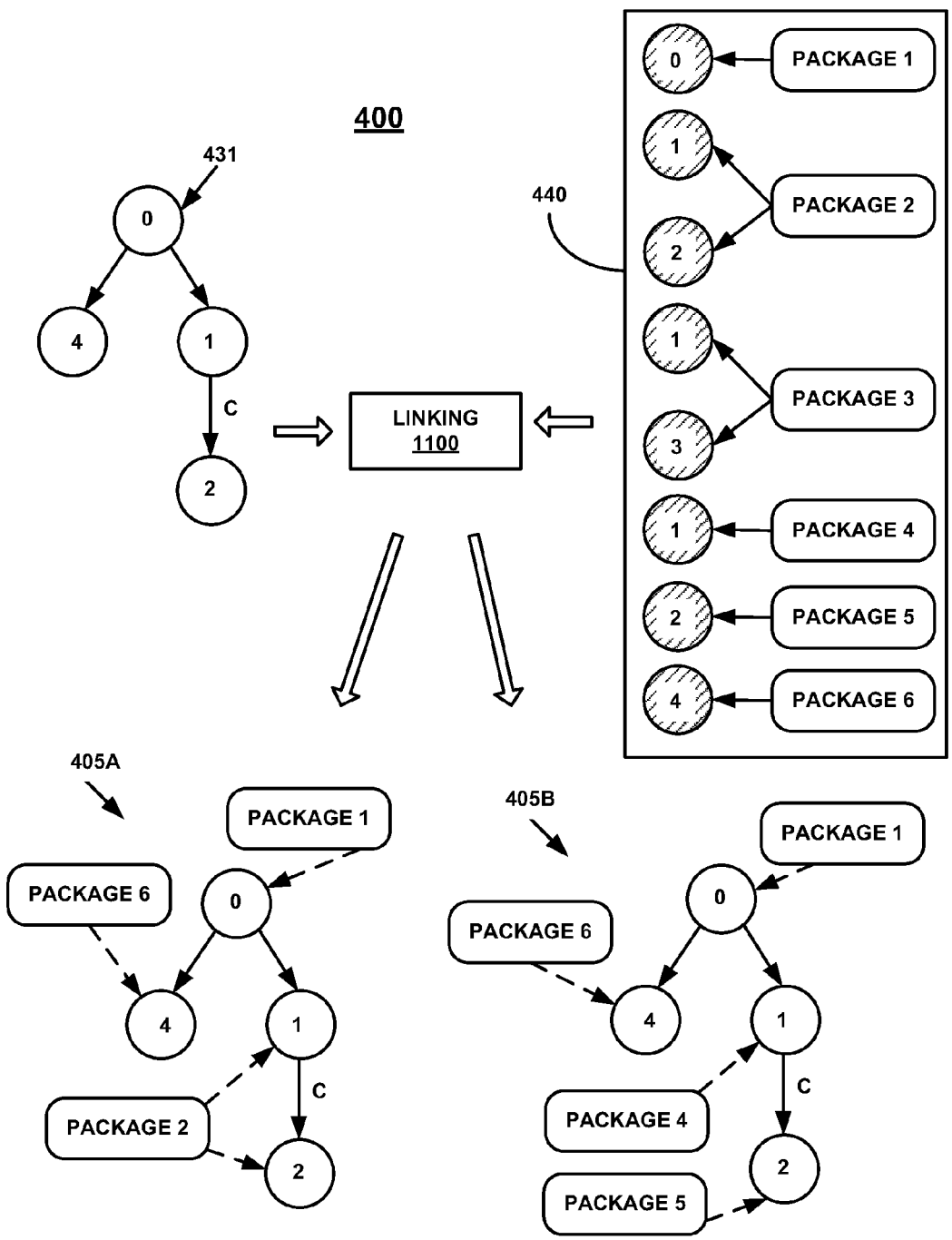
FIG. 4 is a block diagram illustrating linking of a service model instance to packages, in accordance with an embodiment.

FIG. 4 is a block diagram 400 illustrating linking of a service model instance 431 to packages (one or more of packages 1-6), in accordance with an embodiment. As illustrated in FIG. 4, service model instance 431 is represented by a tree composed of nodes. Node 0 is the root node, and has child nodes 4 and 1. Node 1 has child node 2 which has a containment association (C) with node 1. In other words, node 2 is contained by node 1. Package repository 440 includes a plurality of Packages (Package 1-Package 6) that are stored therein. In service model instance 431, instances are represented by the unhatched node ellipses and the number inside each node represents a "type" of the instance. The root node therefore represents an instance of Type 0. The hatched ellipses associated with packages 1-6 represent capabilities provided by a package, and the number inside the hatched ellipses indicates the "type" of that capability. For instance Package 1 provides a single capability corresponding to Type 0.

Following a linking process 1100 (described below in conjunction with FIGS. 11A and 11B), linked instances 405A and 405B are created. Linked instance 405A comprises package 1 being linked to node 0, package 6 being linked to node 4, and package 2 being linked to both nodes 1 and 2. Linked instance 405B comprises package 1 being linked to node 0, package 6 being linked to node 4, package 4 being linked to node 1 and package 5 being linked to node 2. Various linking rules are followed in the linking of these packages to these nodes. In one embodiment, linked instances 405A and 405B are evaluated with respect to one another to determine which is superior in some fashion, such as being the most efficient use of packages. In one embodiment, linked instance 405A is evaluated with a better score for efficiency than linked instance 405B, as linked instance 405A utilizes fewer packages. However, in other embodiments, other efficiency criteria such as estimated time to install packages may be employed for evaluation and may yield a different evaluation result.

Linking Rules

FIGS. 5-10 illustrate some non-limiting examples of linking rules, according to one embodiment. FIGS. 5-10 are illustrated with reliance on packages 1-6 that are illustrated in FIG. 4. FIGS. 5-10 follow the same convention as FIG. 4, where unhatched ellipses represent nodes of a service model instance and hatched ellipses represent a capability provided by a package. The number inside each ellipse represents either the type of an instance for a node, or the type of capability for a package. Although numbers are employed in these examples to represent types, it is appreciated that the types can be tied to operational instances in the manner illustrated in FIG. 1. It is appreciated that these linking rules are given as non-limiting examples and that many other rules are possible.

Figure 5:
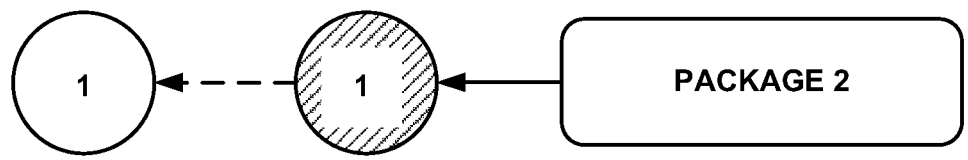
FIGS. 5-10 illustrate some non-limiting examples of linking rules, according to one embodiment.

FIG. 5 illustrates the basic linking rule. According to the basic linking rule, a package can only be linked to an instance if and only if that package provides a capability of the same type and that the package usage constraints are not violated by the instance.

Figure 6:
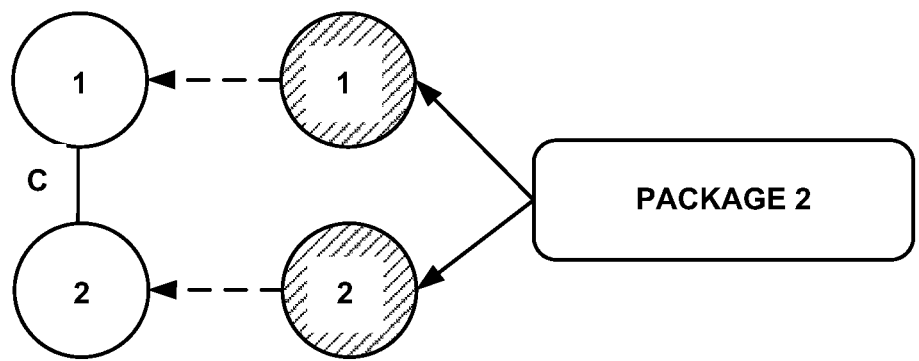

FIG. 6 illustrates the containment linking rule. According to the containment linking rule, if there is an containment (C) association between two nodes (1-2) then a package that provides both nodes (1,2) can be used to satisfy the requirement.

Figure 7:
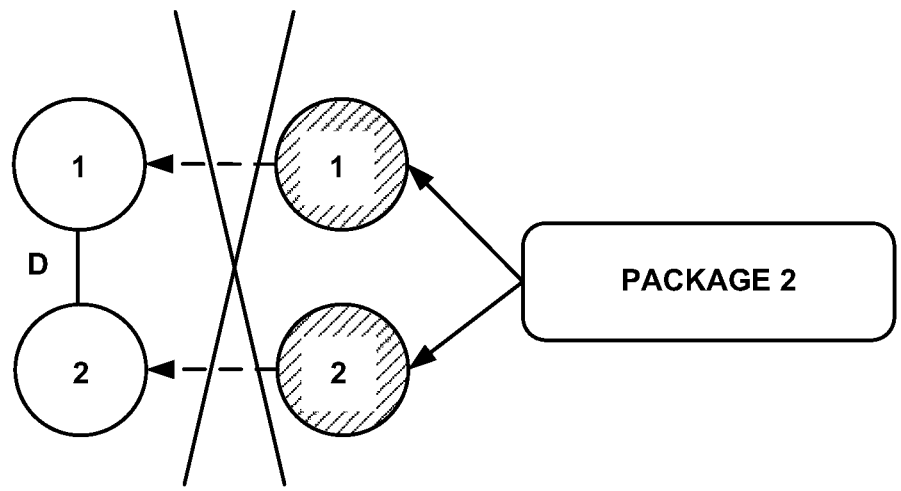

FIG. 7 illustrates the dependence linking rule. According to the dependency linking rule, if there is an dependency association between two nodes (1-2) then a package that provides both nodes (1,2) cannot be used to satisfy the requirement.

Figure 8:
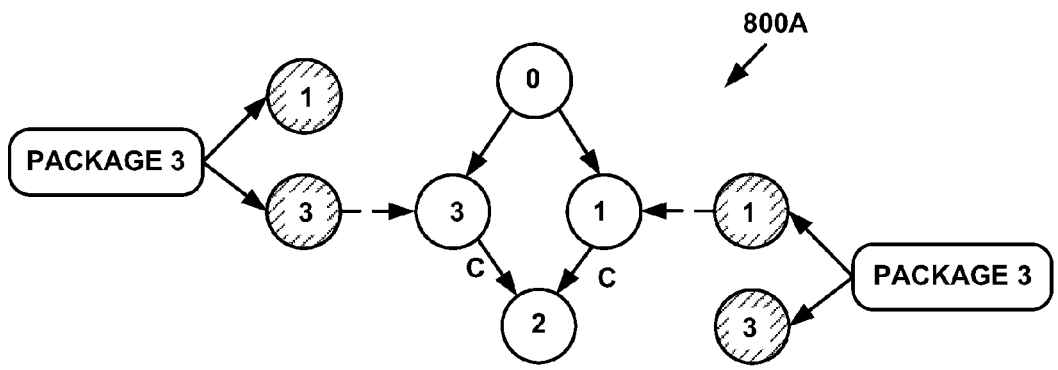
Figure 8:
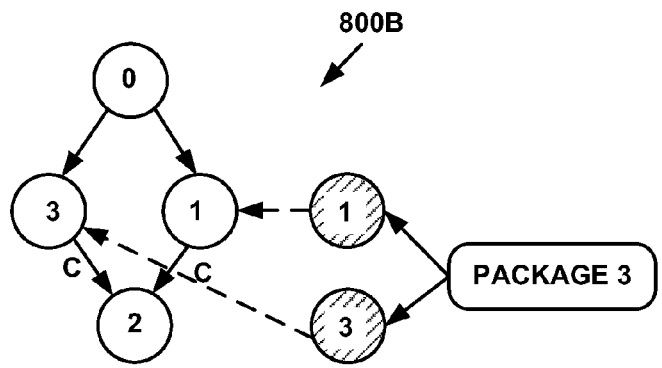

FIG. 8 illustrates the efficient use of n-ary packages linking rule. According to this rule, an n-ary package can be used to link to contained sibling nodes in a single pass. Two linked instances 800A and 800B are illustrated. According to the efficient use of n-ary packages linking rule, it is more efficient to use a single instance of the n-ary package as illustrated in 800B than to use two instances of the n-ary package as in 800A.

Figure 9:
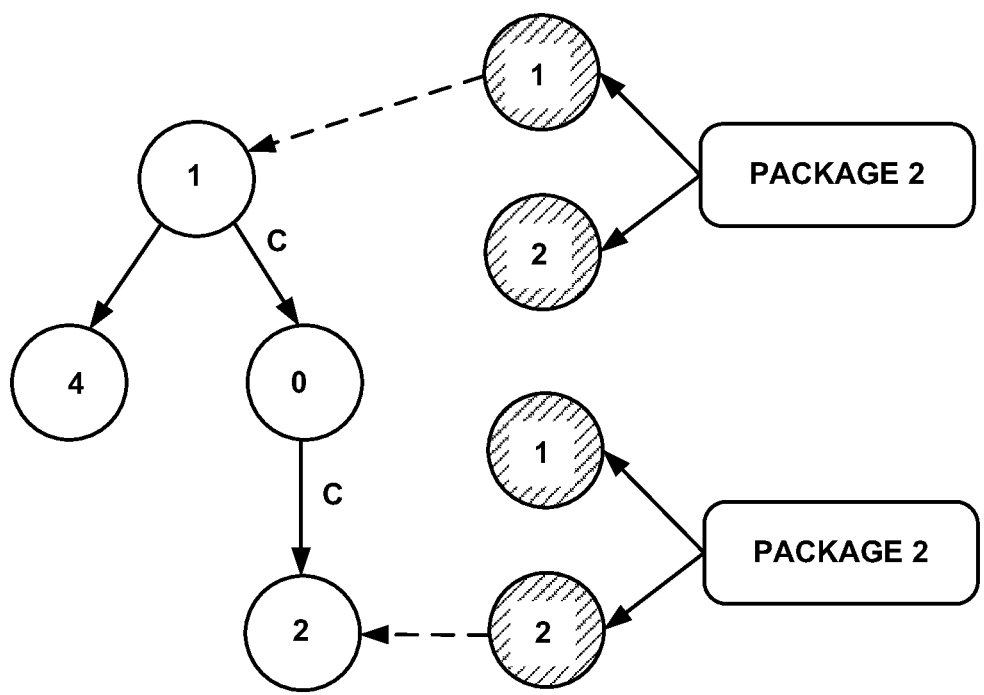

FIG. 9 illustrates the transitive containment for n-ary packages linking rule. According to this rule, if there is a transitive containment association between two nodes (ex: 0-2) then an n-ary package that provides both nodes (0,2) cannot be used to link 0 and 2 in a single shot, but would instead have to be used twice. As illustrated by FIG. 9, this is because node 1 acts as a container for node 0.

Figure 10:
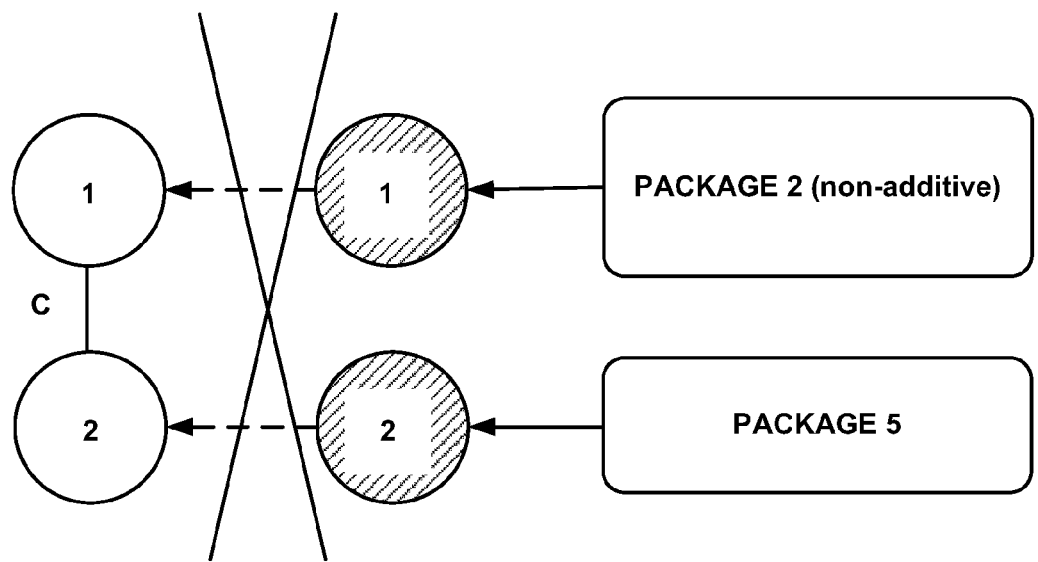

FIG. 10 illustrates the non-additive package linking rule. According to this rule, if there is a containment association (C) between two nodes (1-2), a non-additive package cannot be used to bind the dependent node.

Example Methods of Operation

The following discussion sets forth in detail the operation of some example methods of operation of embodiments. With reference to FIG. 11A, FIG. 11B, FIG. 12A and FIG. 12B, flow diagrams 1100 and 1200 illustrate example procedures used by various embodiments. Flow diagrams 1100 and 1200 include some procedures that, in various embodiments, are carried out by a processor under the control of computer-readable and computer-executable instructions. In this fashion, one or both of flow diagrams 1100 and 1200 are implemented using a computer, in various embodiments. The computer-readable and computer-executable instructions can reside in any tangible computer readable storage media, such as, for example, in data storage features such as computer usable volatile memory 1308, computer usable non-volatile memory 1311, peripheral computer-readable storage media 1302, and/or data storage unit 1312 (all of FIG. 13). The computer-readable and computer-executable instructions, which reside on tangible computer readable storage media, are used to control or operate in conjunction with, for example, one or some combination of processors 1306A, 1306B, and 1306C of FIG. 13, or other similar processor(s). Although specific procedures are disclosed in flow diagrams 1100 and 1200, such procedures are examples. That is, embodiments are well suited to performing various other procedures or variations of the procedures recited in flow diagrams 1100 and 1200. Likewise, in some embodiments, the procedures in flow diagrams 1100 and 1200 may be performed in an order different than presented and/or not all of the procedures described in one or both of these flow diagrams may be performed.

Example Method of Linking Model Instances to Packages

Figure 11A:
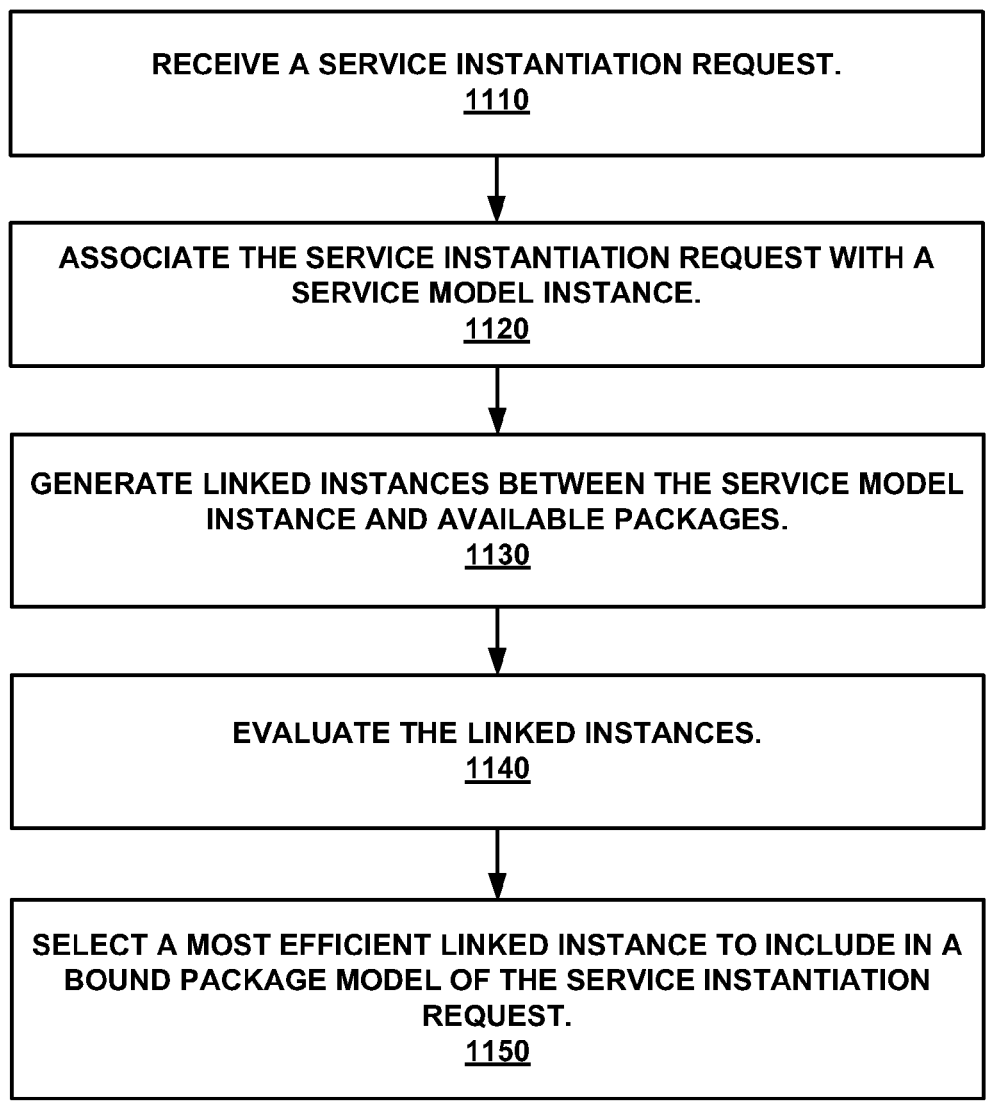
FIG. 11A is a flow diagram of an example method of linking model instances to packages, according to one embodiment.
Figure 11B:
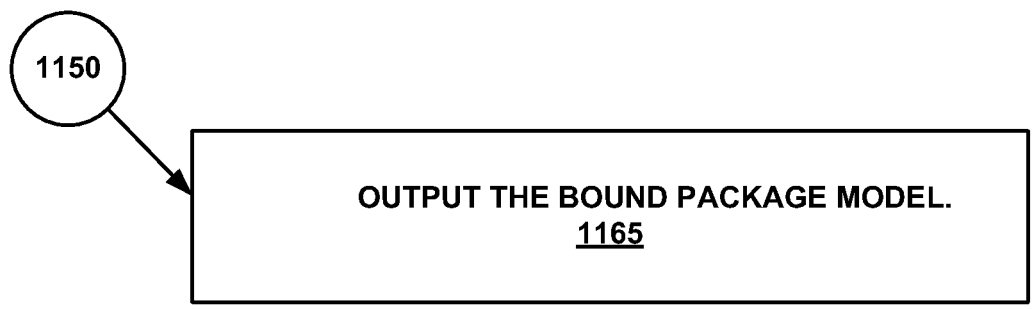
FIG. 11B illustrates an embodiment of the method of flow diagram of FIG. 11A with an additional procedure.

FIG. 11A illustrates a flow diagram 1100 of an example embodiment of a method of linking model instances to packages. FIG. 11B illustrates an embodiment of the method of flow diagram 1100 with an additional procedure. Elements of flow diagram 1100 are described below, with reference to elements of FIGS. 1-10. In one embodiment, flow diagram 1100 represents a method of operation of package model design system 100.

At 1110 of flow diagram 1100, in one embodiment, the method receives a service instantiation request. With reference to the example of FIG. 1, in one embodiment, this comprises service request receiver 210 of service instance binder 120 receiving a service instantiation request 110.

At 1120 of flow diagram 1100, in one embodiment, the method associates the received service instantiation request with a service model instance. With continued reference to the example of FIG. 1, in one embodiment, this comprises request-to-model associator 220 of service instance binder 120 associating service instantiation request 110 with service model instance 131-1 of service model instance repository 130.

At 1130 of flow diagram 1100, in one embodiment, the method generates linked instances between the service model instance and available packages. With continued reference to the example of FIG. 1, in one embodiment, this comprises linked instance generator 230 generating the linked instance by linking nodes of service model instance 131-1 with packages of package repository 140.

In one embodiment, the linked instance generation includes model accessor 310 accessing the associated service model instance 131-1 and model traverser 320 traversing the nodes of service model instance 131-1. In one embodiment, the linked instance generation includes package assigner 330 assigning packages 141 that match to the type of each node of the service model instance during the traversing of the nodes (it is appreciated that the nodes may be traversed recursively to generate a plurality of differing linked instances for evaluation while in other embodiments it may only be possible to create a single unique linked instance from the available packages 141). In one embodiment, the linked instance generation includes package evaluator 350 evaluating a package assigned to a child node to check for package conflict prior to assigning an available package to a parent node of the child node. In one embodiment, the linked instance generation includes node-package linker 340 creating a link between each node and its respective assigned package to generate a linked instance of the service model instance. It is appreciated that node-package linker 340 utilizes and follows a set of rules to evaluate package use and dependencies with respect to the service model instance and that assigned packages are linked to nodes or not linked to nodes based upon these rules. FIGS. 5-10 illustrate an example set of rules that are utilized in one embodiment.

At 1140 of flow diagram 1100, in one embodiment, the method evaluates the linked instances that have been generated. In one embodiment, this comprises linked instance evaluator 240 evaluating each of a plurality of linked instances that have been generated. With reference to FIG. 4, in one embodiment, for example, linked instance evaluator 240 evaluates linked instances 405A and 405B. With reference to the example of FIG. 1, in one embodiment, this comprises linked instance evaluator 240 evaluating the linked instances (1, 2, and 3) of:

1) Tomcat(tomcat.rpm)-Fedora8(fedora.img), which is generated by linking packages 141-4 to the Tomcat node and package 141-2 to the OS node of service model Instance 131-1;
2) Tomcat(fedora8-tomcat.img)-Fedora8(fedora8-tomcat.img), which is generated by linking package 141-2 to both the Tomcat and OS nodes of service model instance 131-1; and 3) Tomcat(tomcat.msi)-Windows2003 Server (win2003server.img), which is generated by linking package 141-1 to the Tomcat node and package 141-n to the OS node of service model instance 131-1.

With reference to FIG. 11B, at 1150 of one embodiment of flow diagram 1100, and based on the results of the evaluating of 1140, the method selects a most efficient linked instance of the evaluated linked instances. The selected linked instance is selected to include in a bound package model of the service instantiation request. One or more preset or user/operator selectable rules are utilized to evaluate the efficiency of the linked instances with respect to one another. In one embodiment, linked instance selector 250 performs the selection. With reference to FIG. 4, in one embodiment, linked instance selector 250 selects linked instance 405A as it was evaluated to have a better efficiency score because fewer packages are used as compared to linked instance 405B. With reference to the example of FIG. 1, in one embodiment, linked instance selector 250 selects linked instance 2 (Tomcat(fedora8-tomcat.img)-Fedora8(fedora8-tomcat.img)) as it was evaluated to have a better efficiency score because fewer packages were used as compared to linked instances 1 and 3. In one embodiment, the selecting of 1150 further comprises monitoring for package use during creation of a bound package model. In some embodiments, the actual use of a package is monitored so as to update availability of a package or licenses available for a particular package.

With reference to FIG. 11B, at 1165 in one embodiment of flow diagram 1100, the method outputs the bound package model. In one embodiment, this comprises output engine 260 outputting the bound package model for grounding or other use.

Figure 12A:
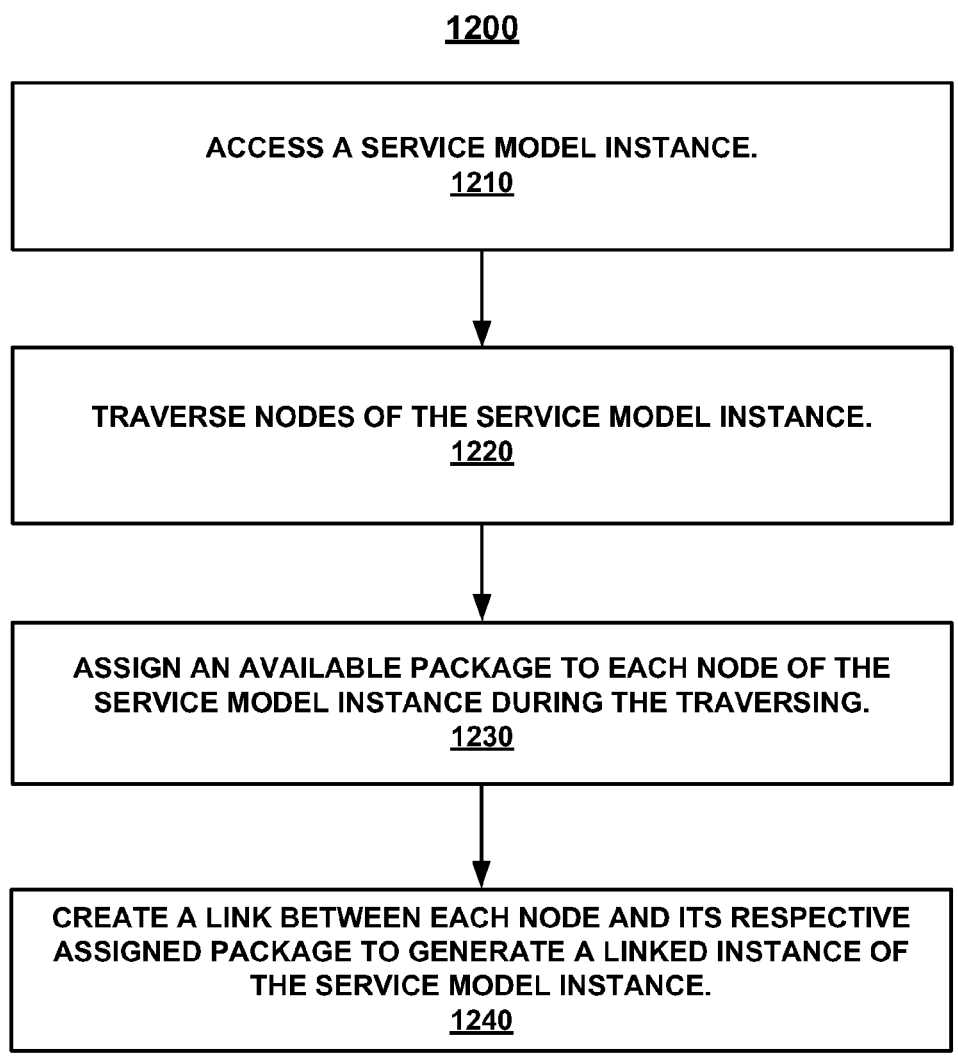
FIG. 12A is a flow diagram of an example method of generating linked instances between a server model instance and available packages, according to one embodiment.
Figure 12B:
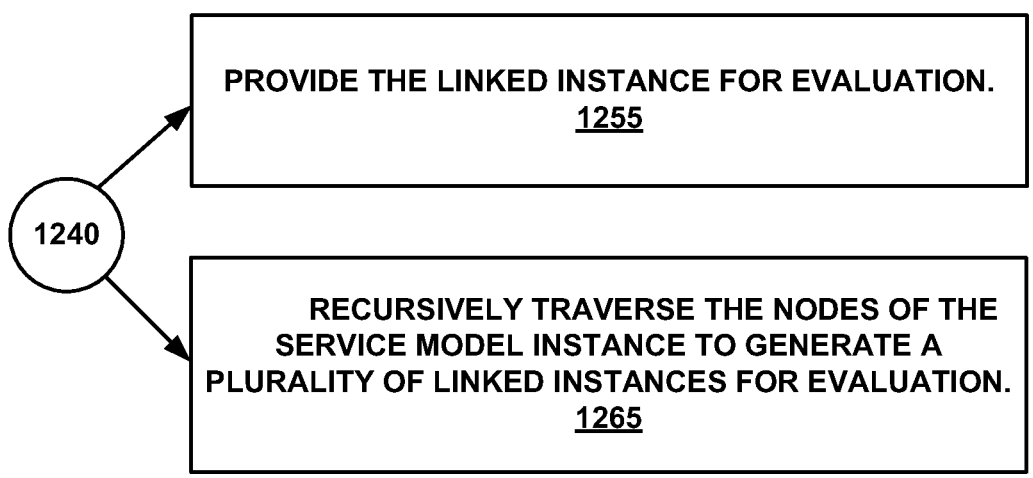
FIG. 12B illustrates an embodiment of the method of flow diagram of FIG. 12A with one or more additional procedures.

Example Method of Generating Linked Instances Between a Service Model Instance and Available Packages FIG. 12A illustrates a flow diagram 1200 of an example embodiment of a method of instantiating generating linked instances between a service model instance and available packages. FIG. 12B illustrates an embodiment the method of flow diagram 1200 with one or more additional procedures. Elements of flow diagram 1200 are described below, with reference to elements of FIGS. 1-10 and flow diagram 1100 of FIGS. 11A-11B. In one embodiment, flow diagram 1200 represents a method of operation of linked instance generator 230.

At 1210 of flow diagram 1200, in one embodiment, the method accesses a service model instance. With reference to the example illustrated by FIG. 1, in one embodiment, the linked instance generation comprises model accessor 310 accessing an associated service model instance 131-1 that has been associated with a received service instantiation request (e.g., service instantiation request 110 of FIG. 1).

At 1220 of flow diagram 1200, in one embodiment, the method traverses nodes of the accessed service model instance. With continued reference to the example illustrated by FIG. 1, in one embodiment, the linked instance generation comprises model traverser 320 traversing the nodes of service model instance 131-1. It is appreciated that, in some embodiments, the traversing of the nodes of a service model instance can be performed recursively to generate a plurality of linked instances for evaluation. In one embodiment, the tree represented by service model instance 131-1 is traversed from the root node to each extremity and assignments and links are made starting at the extremities and working toward back the root node.

At 1230 of flow diagram 1200, in one embodiment, the method assigns an available package to each node of the accessed service model instance during the course of the traversing. With continued reference to the example illustrated by FIG. 1, in one embodiment, the linked instance generation comprises package assigner 330 assigning packages 141 that match to the type of each node of the service model instance during the traversing of the nodes. In one embodiment, the linked instance generation includes package evaluator 350 evaluating a package assigned to a child node to check for package conflict prior to assigning an available package to a parent node of the child node. This could comprise a conflict such as the parent node possibly overwriting the package assigned the child node. Evaluating, while working backwards from extremity to root node, reduces or eliminates such conflicts.

At 1240 of flow diagram 1200, in one embodiment, the method creates a link between each node and its respective assigned package to generate a linked instance of the service model instance. With continued reference to the example illustrated by FIG. 1, in one embodiment, the linked instance generation comprises node-package linker 340 creating a link between each node and its respective assigned package to generate a linked instance of the service model instance. Linked instances 405A and 405B of FIG. 4 are examples of such linked instances. It is appreciated that node-package linker 340 utilizes and follows a set of rules to evaluate package use and dependencies with respect to the service model instance and that assigned packages are linked to nodes or not linked to nodes based upon these rules. FIGS. 5-10 illustrate an example set of rules that are utilized in one embodiment.

At 1255 of flow diagram 1200, in one embodiment, the method provides the linked instance for evaluation. In one embodiment, this comprises linked instance generator 230 communicatively coupling the generated linked instance (or instances) to linked instance evaluator 240 for evaluation.

At 1265 of flow diagram 1200, in one embodiment, the method recursively traverses the nodes of the service model instance to generate a plurality of linked instances for evaluation. As previously described, in one embodiment, model traverser 320 recursively traverse the nodes of service model instance 131-1 while other components of linked instance generator 230 operate in the previously described manner to generate one or more additional linked instances (when possible) that differ from the first linked instance.

Example Computer System Environment

Figure 13:
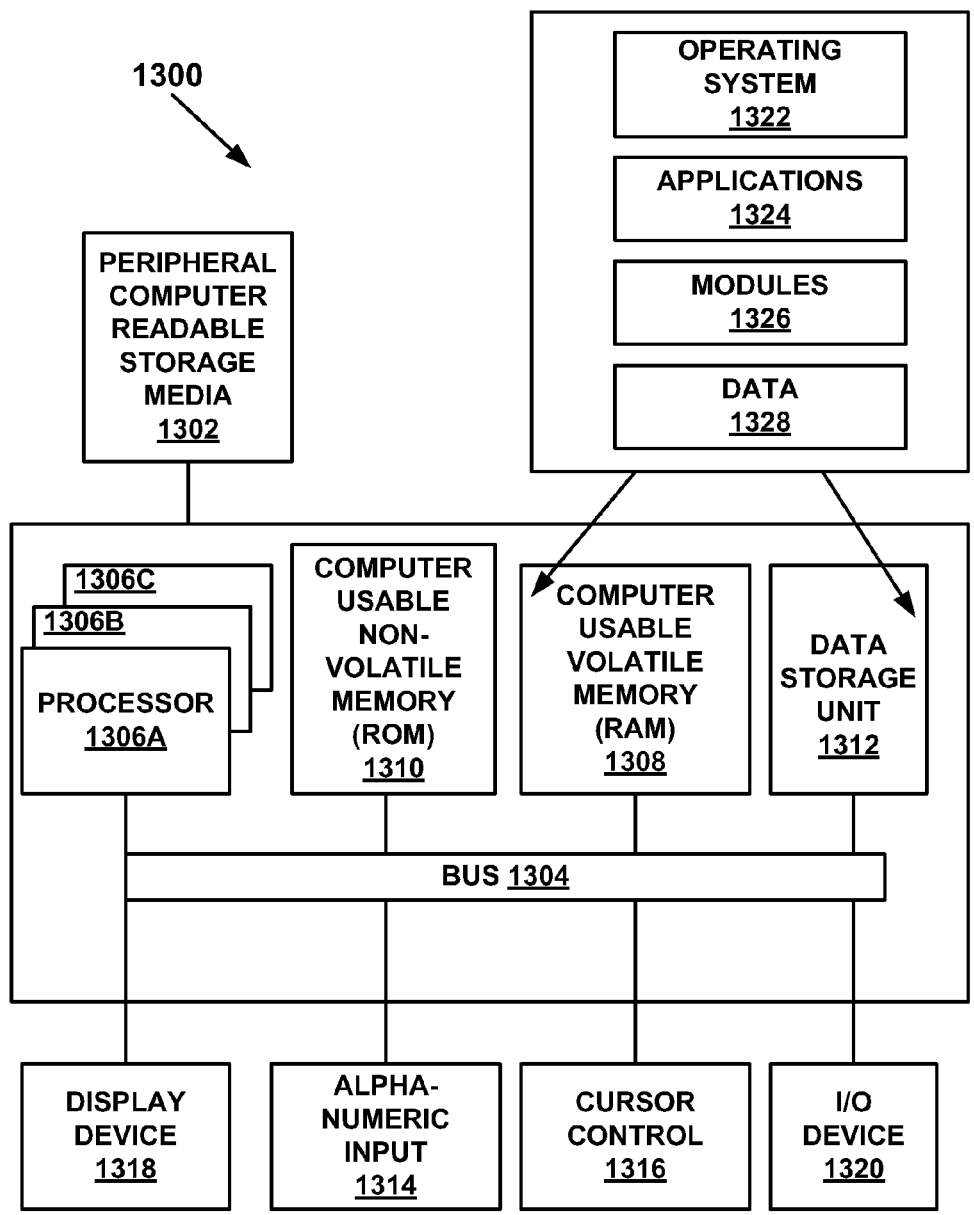
FIG. 13 is a block diagram of an example computer system, according to an embodiment, with which or upon which embodiments of the present invention can be implemented.

With reference now to FIG. 13, all or portions of some embodiments described herein are composed of computer-readable and computer-executable instructions that reside, for example, in computer-usable/computer-readable storage media of a computer system. That is, FIG. 13 illustrates one example of a type of computer (computer system 1300) that can be used in accordance with or to implement various embodiments which are discussed herein. It is appreciated that computer system 1300 of FIG. 13 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, server blades, datacenters, datacenter management systems, and the like. Computer system 1300 of FIG. 13 is well adapted to having peripheral computer-readable storage media 1302 such as, for example, a floppy disk, a compact disc, a digital versatile disc (DVD), a USB (universal serial bus) flash memory drive and the like coupled thereto.

System 1300 of FIG. 13 includes an address/data bus 1304 for communicating information, and a processor 1306A coupled to bus 1304 for processing information and instructions. As depicted in FIG. 13, system 1300 is also well suited to a multi-processor environment in which a plurality of processors 1306A, 1306B, and 1306C are present. Conversely, system 1300 is also well suited to having a single processor such as, for example, processor 1306A. Processors 1306A, 1306B, and 1306C may be any of various types of microprocessors. System 1300 also includes data storage features such as a computer usable volatile memory 1308, e.g. random access memory (RAM), coupled to bus 1304 for storing information and instructions for processors 1306A, 1306B, and 1306C. System 1300 also includes computer usable non-volatile memory 1310, e.g. read only memory (ROM), coupled to bus 1304 for storing static information and instructions for processors 1306A, 1306B, and 1306C. Also present in system 1300 is a data storage unit 1312 (e.g., a magnetic or optical disk and disk drive) coupled to bus 1304 for storing information and instructions.

In some embodiments, system 1300 also optionally includes other components. For example, system 1300 also includes an optional alphanumeric input device 1314 including alphanumeric and function keys coupled to bus 1304 for communicating information and command selections to processor 1306A or processors 1306A, 1306B, and 1306C. System 1300 also includes an optional cursor control device 1316 coupled to bus 1304 for communicating user input information and command selections to processor 1306A or processors 1306A, 1306B, and 1306C. In one embodiment, system 1300 also includes an optional display device 1318 coupled to bus 1304 for displaying information.

Referring still to FIG. 13, optional display device 1318 of FIG. 13 may be a liquid crystal device, cathode ray tube, plasma display device or other display device suitable for creating graphic images and alphanumeric characters recognizable to a user. Optional cursor control device 1316 allows the computer user to dynamically signal the movement of a visible symbol (cursor) on a display screen of display device 1318 and indicate user selections of selectable items displayed on display device 1318. Many implementations of cursor control device 1316 are known in the art including a trackball, mouse, touch pad, joystick or special keys on alphanumeric input device 1314 capable of signaling movement of a given direction or manner of displacement. Alternatively, it will be appreciated that a cursor can be directed and/or activated via input from alpha-numeric input device 1314 using special keys and key sequence commands. System 1300 is also well suited to having a cursor directed by other means such as, for example, voice commands, System 1300 also includes an I/O device 1320 for coupling system 1300 with external entities. For example, in one embodiment, I/O device 1320 is a modem for enabling wired or wireless communications between system 1300 and an external network such as, but not limited to, the Internet, Referring still to FIG. 13, various other components are depicted for system 1300. Specifically, when present, an operating system 1322, applications 1324, modules 1326, and data 1328 are shown as typically residing in one or some combination of computer usable volatile memory 1308 (e.g., RAM), computer usable non-volatile memory 1310 (e.g., ROM), and data storage unit 1312. In some embodiments, all or portions of various embodiments described herein are stored, for example, as an application 1324 and/or module 1326 in memory locations within RAM 1308, computer-readable storage media within data storage unit 1312, peripheral computer-readable storage media 1302, and/or other tangible computer readable storage media.

Example embodiments of the subject matter are thus described. Although various embodiments of the subject matter have been described in a language specific to structural features and/or methodological acts, it is to be understood that the appended claims are not necessarily limited to the specific features or acts described above. Rather, the specific features and acts described above are disclosed as example forms of implementing the claims and their equivalents.

What is claimed is:

1. A non-transitory computer-readable storage medium having instructions stored thereon which, when executed, cause a computer processor to perform a method of linking model instances to packages for remotely provided information technology (IT) services, said method comprising instructions for:
   receiving a service instantiation request from a customer of said remotely provided IT services;
   associating said service instantiation request with a service model instance, wherein said service model instance comprises nodes linked in hierarchical order;
   generating linked instances between said service model instance and available packages, wherein said generating linked instances comprises assigning an available package to each node of said service model instance;
   evaluating said linked instances;
   based on said evaluating, selecting a most efficient linked instance of said linked instances to include in a bound package model of said service instantiation request; and
   outputting said bound package model to said customer of said remotely provided IT services.

2. The non-transitory computer-readable storage medium of claim 1, wherein said generating linked instances between said service model instance and available packages further comprises instructions for:
   utilizing a set of rules to evaluate package use and dependencies with respect to said service model instance.

3. The non-transitory computer-readable storage medium of claim 1, wherein said generating linked instances between said service model instance and available packages comprises instructions for:
   traversing said nodes of said service model instance; and
   creating a link between each node and its respective assigned package to generate a linked instance of said service model instance.

4. The non-transitory computer-readable storage medium of claim 3, further comprising:
   recursively traversing said nodes of said service model instance to generate a plurality of linked instances for evaluation.

5. The non-transitory computer-readable storage medium of claim 1, wherein said selecting a most efficient linked instance to include in a bound package model of said service instantiation request further comprises instructions for:
   monitoring for package use during creation of said bound package model.

6. A computer-implemented method of generating linked instances between a service model instance and available packages for remotely provided information technology (IT) services, said method comprising:
   accessing a service model instance linked with a service instantiation request from a customer of said remotely provided IT services;

recursively traversing nodes of said service model instance, wherein said nodes are linked in hierarchical order;

assigning an available package to each node of said service model instance during said traversing; and creating a link between each node and its respective assigned package to generate a plurality of linked instances of said service model instance.

7. The computer-implemented method as recited in claim 6, further comprising:

providing said instances for evaluation.

8. The computer-implemented method as recited in claim 6, wherein said assigning an available package to each node of said service model instance during said traversing comprises:

evaluating a package assigned to a child node to check for package conflict prior to assigning an available package to a parent node of said child node.

9. A non-transitory computer readable storage medium having computer readable program code embedded therein for remotely provided information technology (IT) services, the program code comprising:

a service instance binder configured to bind a selected linked instance of a service model instance into a bound package model, wherein said service model instance is linked with a service instantiation request from a customer of said remotely provided IT services;

a service model instance repository communicatively coupled with said service instance binder and storing a plurality of service model instances, including said service model instance;

a package repository communicatively coupled with said service instance binder and said service model repository and including a plurality of packages, wherein said nodes are linked in hierarchical order; and a linked instance generator configured for generating linked instances between each node and its respectively assigned package to generate a plurality of linked instances.

10. The non-transitory computer readable storage medium of claim 9, wherein said service instance binder comprises:

a request-to-model associator configured for associating a service instantiation request with said service model instance.

11. The non-transitory computer readable storage medium of claim 9, wherein said service instance binder comprises:

a linked instance evaluator configured for evaluating efficiency of all or a portion of a linked instance.

12. The non-transitory computer readable medium of claim 9, wherein said service instance binder comprises:

a linked instance selector for selecting, based on an efficiency evaluation, said selected linked instance, from said plurality of linked instances, to include in said bound package model.

* * * * *

UNITED STATES PATENT AND TRADEMARK OFFICE
CERTIFICATE OF CORRECTION

| | | |
|---|---|---|
| PATENT NO. | : 8,930,887 B2 | Page 1 of 1 |
| APPLICATION NO. | : 13/384675 | |
| DATED | : January 6, 2015 | |
| INVENTOR(S) | : Mathias Salle et al. | |

It is certified that error appears in the above-identified patent and that said Letters Patent is hereby corrected as shown below:

On the Title Page

In (56) References Cited, OTHER PUBLICATIONS, page 2, column 1, line 2, delete "Internationall" and insert -- International --, therefor.

In (56) References Cited, OTHER PUBLICATIONS, page 2, column 2, line 2, delete "PCT/US2009/052578" and insert -- PCT/US2009/052576 --, therefor.

In the Specification

In column 1, line 59, delete "o" and insert -- to --, therefor.

In column 4, line 36, delete "Binding," and insert -- Binding. --, therefor.

In column 7, line 19, delete "I T" and insert -- IT --, therefor.

In column 10, line 67, delete "131-1:" and insert -- 131-1; --, therefor.

In column 13, line 53, delete "commands," and insert -- commands. --, therefor.

In column 13, line 58, delete "Internet," and insert -- Internet. --, therefor.

In the Claims

In column 16, line 22 approx., in Claim 12, delete "medium" and insert -- storage medium --, therefor.

Signed and Sealed this
First Day of March, 2016

Michelle K. Lee
*Director of the United States Patent and Trademark Office*